United States Patent
Kitaori et al.

(10) Patent No.: US 7,444,261 B2
(45) Date of Patent: Oct. 28, 2008

(54) TURNING DETERMINATION APPARATUS AND TURNING DETERMINATION METHOD FOR VEHICLE

(75) Inventors: Ichiro Kitaori, Nagoya (JP); Masami Kondo, Toyota (JP); Naoto Moriya, Toyota (JP); Masato Kaigawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 128 days.

(21) Appl. No.: 11/650,967

(22) Filed: Jan. 9, 2007

(65) Prior Publication Data

US 2007/0162252 A1    Jul. 12, 2007

(30) Foreign Application Priority Data

Jan. 10, 2006    (JP)    ............................. 2006-002552

(51) Int. Cl.
*G06F 19/00* (2006.01)
(52) U.S. Cl. ........................................ 702/145; 701/72
(58) Field of Classification Search ................ 702/145, 702/150, 127, 41, 182–185; 701/1, 72, 70; 324/300
See application file for complete search history.

(56) References Cited

U.S. PATENT DOCUMENTS

| 2004/0002795 | A1* | 1/2004 | Tanimoto et al. | 701/1 |
| 2005/0012501 | A1* | 1/2005 | Isono et al. | 324/300 |
| 2005/0240332 | A1* | 10/2005 | Mori et al. | 701/72 |

FOREIGN PATENT DOCUMENTS

JP    2000-280882 A    10/2000

* cited by examiner

*Primary Examiner*—Edward Raymond
(74) *Attorney, Agent, or Firm*—Sughrue Mion, PLLC

(57) ABSTRACT

An ECU executes a program that includes the steps of setting a vehicle speed to the minimum wheel speed among wheel speeds of four wheels of a vehicle; calculating a difference between the wheel speeds of right and left driven wheels; turning an abnormality flag on when a higher wheel speed is higher than a value obtained by multiplaying a lower wheel speed by α; and determining that the vehicle is turning, and turning a turning flag on, when the abnormality flag is off, a predetermined time has not elapsed after the turning flag is turned on, and the difference between the wheel speeds is equal to or larger than a map value obtained using a map where a vehicle speed is used as a parameter.

13 Claims, 4 Drawing Sheets

TURNING DETERMINATION APPARATUS AND TURNING DETERMINATION METHOD FOR VEHICLE

INCORPORATION BY REFERENCE

The disclosure of Japanese Patent Application No. 2006-002552 filed on Jan. 10, 2006 including the specification, drawings and abstract is incorporated herein by reference in its entirety.

BACKGROUND OF THE INVENTION

1. Field of the Invention

The invention relates to a turning determination apparatus and a turning determination method for a vehicle, and more particularly to an apparatus that accurately determines whether a vehicle is turning, using wheel speeds.

2. Description of the Related Art

There is a turning determination apparatus that determines whether a vehicle is turning based on signals that indicate wheel speeds of right and left wheels. This apparatus may make an erroneous determination when the roughness level of the road surface on which the right wheel moves is different from the roughness level of the road surface on which the left wheel moves.

Japanese Patent Application Publication No. JP-A-2000-280882 describes a turning determination apparatus for a vehicle, which prevents such an erroneous determination. The turning determination apparatus for a vehicle includes left wheel-speed detection means, right wheel-speed detection means, turning state signal output means, turning determination means, and road-surface determination signal output means. The left wheel-speed detection means detects the wheel speed of the left wheel of a vehicle. The right wheel-speed detection means detects the wheel speed of the right wheel of the vehicle. The turning state signal output means detects the state of the vehicle based on a difference between the wheel speeds of the right and left wheels, which are detected by the right wheel-speed detection means and left wheel-speed detection means, and outputs a turning state signal that indicates the state of the vehicle. The turning determination means determines that the vehicle is turning when the value of the turning state signal output from the turning state signal output means exceeds a predetermined turning determination threshold value. The road-surface determination signal output means detects the roughness level of a road surface, and outputs a road-surface determination signal that indicates the roughness level of the road surface. In the turning determination apparatus for a vehicle, the predetermined turning determination threshold value, which is used by the turning determination means, is set to a value obtained by adding the value of the road-surface determination signal output from the road-surface determination signal output means to a reference threshold value.

In the turning determination apparatus for a vehicle, the turning determination threshold value, which is used by the turning determination means to determine whether the vehicle is turning, is set to the value obtained by adding the value of the road-surface determination signal output from the road-surface determination signal output means to the reference threshold value. Thus, when the roughness level of the road surface on which the right wheel moves is different from the roughness level of the road surface on which the left wheel moves, the predetermined turning determination threshold value is higher than the reference threshold value by the added value of the road-surface determination signal. This prevents an erroneous determination from being made due to the road surface condition. Also, when the turning determination apparatus is provided in a vehicle equipped with an anti-skid control apparatus that includes wheel-speed detection means as an essential element, it is not necessary to newly provide a sensor. This suppresses an increase in the cost.

In the above-described turning determination apparatus for a vehicle, the state of the vehicle is determined based on the difference between the wheel speeds of the right and left wheels. When the value of the turning state signal, which indicates the state of the vehicle, exceeds the turning determination threshold value, it is determined that the vehicle is turning. Also, the turning determination threshold value, which is used to determine whether the vehicle is turning, is corrected based on the roughness level of the road surface. Because the wheel speed greatly varies depending on the road surface condition and the slip state of the wheel, the wheel speed may greatly deviate from a normal wheel speed.

In the above-described turning determination apparatus for a vehicle, although the turning determination threshold value is corrected based on the roughness level of the road surface, it may be erroneously determined that the vehicle is turning if the detected wheel speed is abnormal due to the road surface condition or the slip state of the wheel. That is, if one of the right and left wheels slips on a low-μ road surface when the vehicle moves on a straight road, the wheel speed of the wheel that slips suddenly changes. This increases the difference between the wheel speeds of the right and left wheels. As a result, it is erroneously determined that the vehicle is turning, though the vehicle moves on the straight road.

SUMMARY OF THE INVENTION

The invention provides a turning determination apparatus and a turning determination method for a vehicle, which can accurately determine whether a vehicle is turning by detecting wheel speeds of right and left wheels, even when the wheel speed of one of the right and left wheels greatly changes due to a slip or the like.

A first aspect of the invention relates to a turning determination apparatus for a vehicle. The turning determination apparatus includes a detection device, a calculation device, an abnormality determination device, and a turning determination device. The detection device detects wheel speeds of right and left wheels of a vehicle. The calculation device calculates the limit of a difference between the wheel speeds of the right and left wheels, based on the steering angle of the vehicle and a distance between the right and left wheels. The abnormality determination device determines whether the difference between the wheel speeds of the right and left wheels is normal, based on the difference between the wheel speeds of the right and left wheels and the limit of the difference. When the difference between the wheel speeds of the right and left wheels is normal, the turning determination device determines whether the vehicle is turning based on the difference between the wheel speeds of the right and left wheels.

In the above-described turning determination apparatus for a vehicle, for example, when one of the right and left wheels slips, the difference between the wheel speeds of the right and left wheels is large. When the tires grip the road surface, the difference between the wheel speeds of the right and left wheels never exceeds the limit of the difference, which is calculated based on the steering angle of the vehicle and the distance between the right and left wheels. Therefore, it is possible to determine whether the difference between the wheel speeds of the right and left wheels is normal, based on the difference between the wheel speeds of the right and left wheels, and the limit of the difference. Further, when the difference between the wheel speeds of the right and left wheels is normal (i.e., when the slip or the like does not occur, and the wheels is moving in a normal state), it is determined whether the vehicle is turning based on the difference of the wheel speeds of the right and left wheels. When the difference of the wheel speeds is large, it is determined that the vehicle is turning. When the difference of the wheel speeds is small, it is determined that the vehicle is not turning. As a result, it is possible to provide the turning determination apparatus for a vehicle, which can accurately determine whether the vehicle is turning by detecting the wheel speeds of the right and left wheels, even when the wheel speed of one of the right and left wheels suddenly changes due to the slip or the like.

A second aspect of the invention relates to a turning determination method that includes detecting wheel speeds of right and left wheels of a vehicle; calculating the limit of a difference between the wheel speeds of the right and left wheels, based on the steering wheel of the vehicle and a distance between the right and left wheels; determining whether the difference between the wheel speeds of the right and left wheels is normal, based on the difference between the wheel speeds of the right and left wheels and the limit of the difference; and determining whether the vehicle is turning, based on the difference between the wheel speeds of the right and left wheels, when the difference between the wheel speeds of the right and left wheels is normal.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
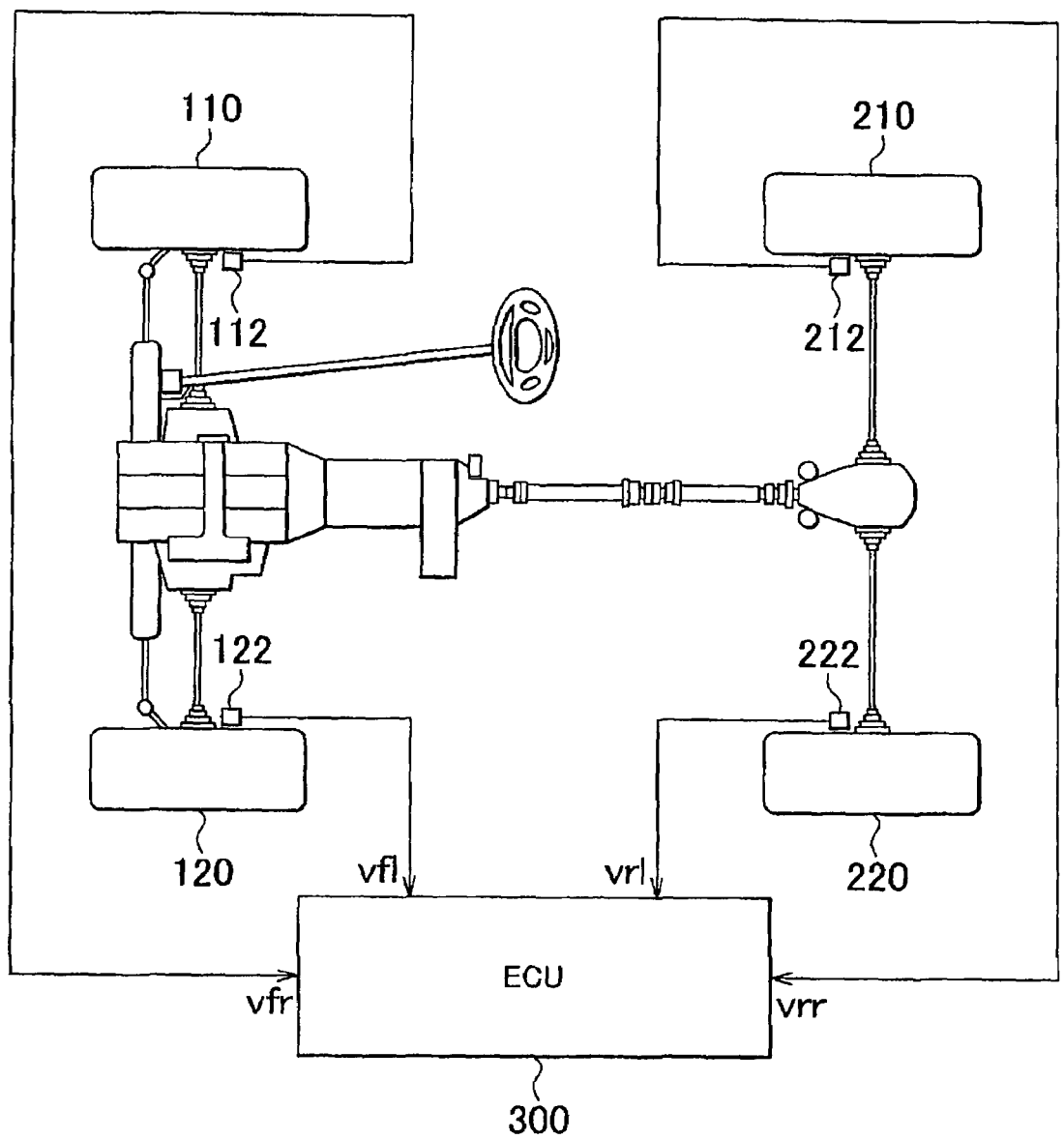
FIG. 1 is a control block diagram of a vehicle provided with a turning determination apparatus according to an embodiment of the invention.

Hereinafter, an embodiment of the invention will be described with reference to the drawings. In the following description, the same components are denoted by the same reference numerals, and the same components have the same names and same functions. Therefore, the redundant detailed description thereof will be omitted.

The configuration of a turning determination apparatus for a vehicle according to the embodiment of the invention will be described with reference to FIG. 1. The turning determination apparatus for a vehicle is realized by a program that is executed by an ECU (Electronic Control Unit) based on signals input to the ECU from wheel-speed sensors. Hereinafter, only the configuration essential for the invention will be described with reference to FIG. 1.

As shown in FIG. 1, the turning determination apparatus for a vehicle includes wheel-speed sensors 112, 122, 212, and 222, and an ECU 300. The wheel-speed sensor 112 detects the wheel speed of a front right wheel 110. The wheel-speed sensor 122 detects the wheel speed of a front left wheel 120. The wheel-speed sensor 212 detects the wheel speed of a rear right wheel 210. The wheel-speed sensor 222 detects the wheel speed of a rear left wheel 220. The ECU 300 receives signals from the wheel-speed sensors 112, 122, 212, and 222, and determines whether the vehicle is turning, using the program described later. Hereinafter, the wheel speed of the front right wheel 110 detected by the wheel-speed sensor 112 will be referred to as "wheel speed vfr". The wheel speed of the front left wheel 120 detected by the wheel-speed sensor 122 will be referred to as "wheel speed vfl". The wheel speed of the rear right wheel 210 detected by the wheel-speed sensor 212 will be referred to as "wheel speed vrr". The wheel speed of the rear left wheel 220 detected by the wheel-speed sensor 222 will be referred to as "wheel speed vrl".

The vehicle shown in FIG. 1 is a front-engine rear-wheel-drive vehicle. However, the invention is not limited to the vehicle that has this power train.

Figure 2A:
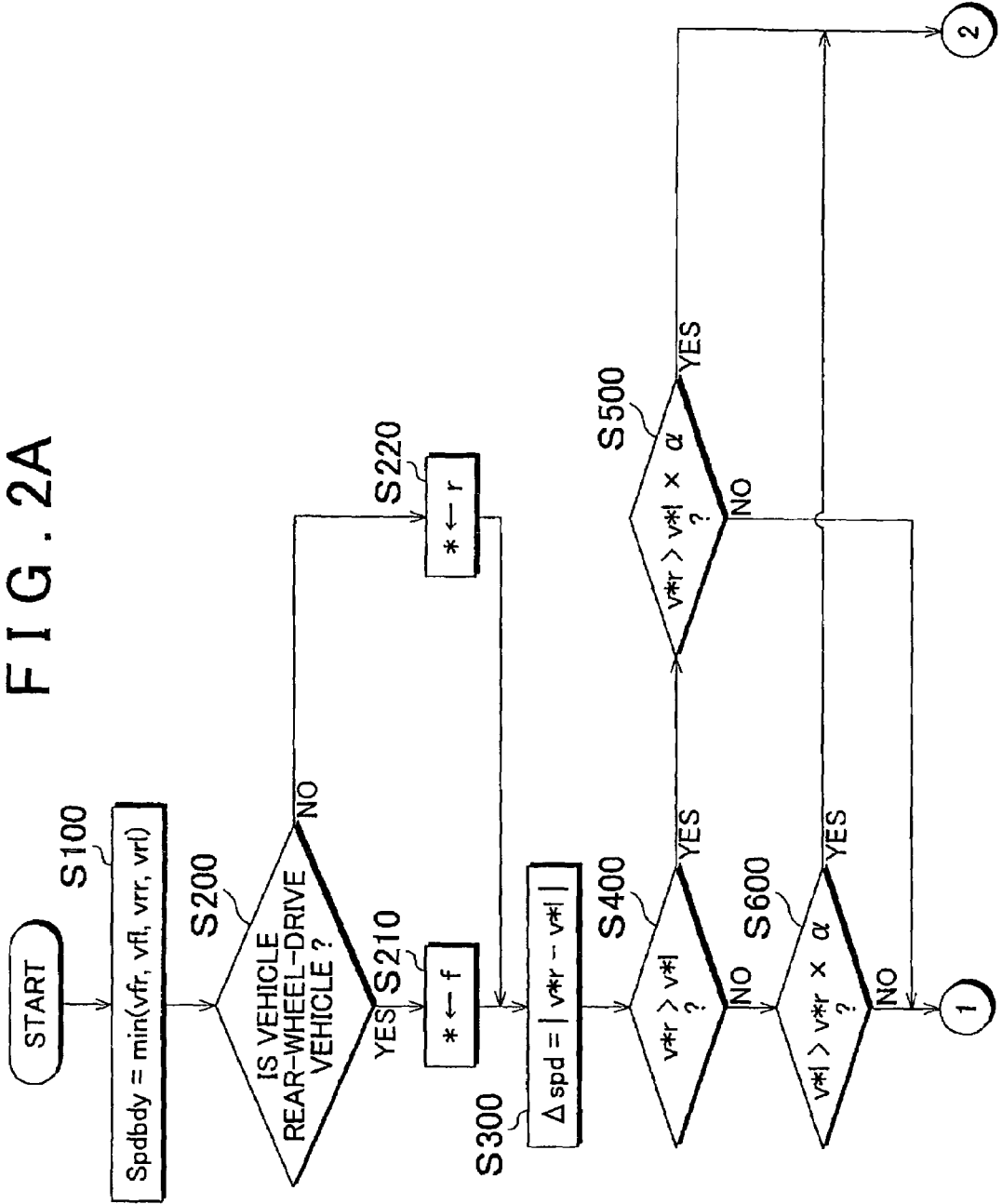
FIGS. 2A and 2B are a flowchart showing the control structure of a program executed by an ECU shown in FIG. 1.
Figure 2B:
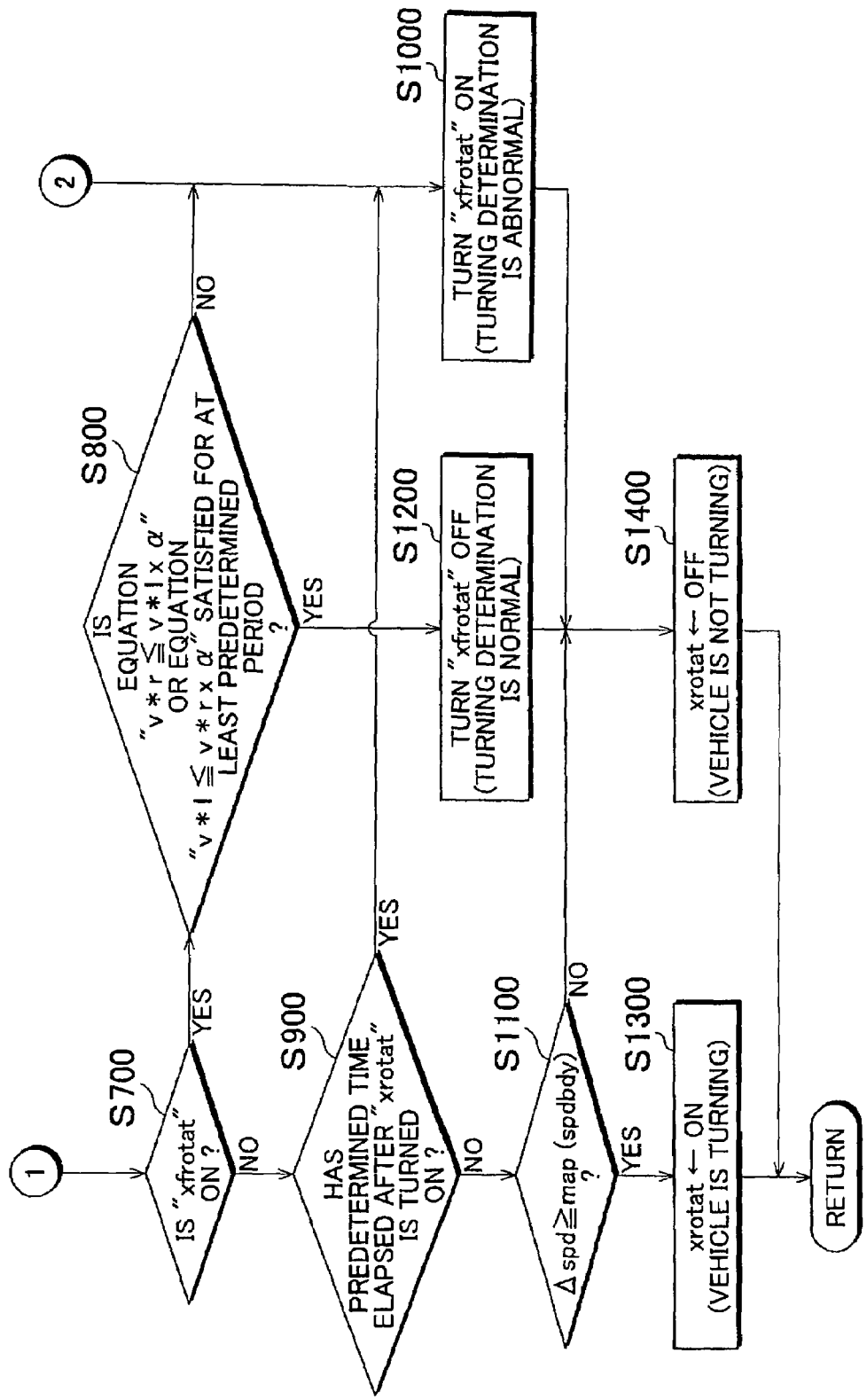

The control structure of the program executed by the ECU 300 in FIG. 1 will be described with reference to FIGS. 2A and 2B.

In step S100, the ECU 300 sets a vehicle speed (vehicle body speed) "spdbdy" to the lowest wheel speed among the wheel speeds (vfr, vfl, vrr, and vrl) of the front right wheel 110, the front left wheel 120, the rear right wheel 210, and the rear left wheel 220, based on the signals input to the ECU 300 from the wheel-speed sensors 112, 122, 212, and 222.

In step S200, the ECU 300 determines whether the vehicle is a rear-wheel-drive vehicle. If it is determined that the vehicle is the rear-wheel-drive vehicle (YES in step S200), the routine proceeds to step S210. If it is determined that the vehicle is not the rear-wheel-drive vehicle (NO in step S200), the routine proceeds to step S220. If the vehicle is a four-wheel-drive vehicle, it is determined whether main drive wheels are the front wheels or the rear wheels in step S200. If the main drive wheels are the rear wheels, it is determined that the vehicle is the rear-wheel-drive vehicle (YES in step S200), and the routine proceeds to step S210. If the main drive wheels are the front wheels, it is determined that the vehicle is a front-wheel-drive vehicle (NO in step S200), and the routine proceeds to step S220.

In step S210, the ECU 300 assigns "f" to "*". In step S220, the ECU 300 assigns "r" to "*". That is, after step S210 is executed, "v*r" "vfr", and "v*l" is "vfl" in the program, and the subsequent steps are executed using the wheel speed of the front right wheel or front left wheel, which is the driven wheel, instead of the rear right wheel or rear left wheel, which is the drive wheel. After step S220 is executed, "v*r" is "vrr", and "v*l" is "vrl" in the program, and the subsequent steps are executed using the wheel speed of the rear right wheel or rear left wheel, which is the driven wheel, instead of the front right wheel or front left wheel, which is the drive wheel.

In step S300, the ECU 300 calculates an absolute value $\Delta$spd of a difference between the wheel speeds of the right and the left wheels, using an equation $|v*r - v*l|$. In step S400, the ECU 300 determines whether the wheel speed "v*r" of the right wheel is higher than the wheel speed "v*l" of the left wheel. If the wheel speed "v*r" of the right wheel is higher than the wheel speed "v*l" of the left wheel (v*r>v*l; YES in step S400), the routine proceeds to step S500. If the wheel speed "v*r" of the right wheel is equal to or lower than the wheel speed "v*l" of the left wheel (v*r≦v*l; NO in step S400), the routine proceeds to step S600.

In step S500, the ECU 300 determines whether the wheel speed "v*r" of the right wheel is higher than a value obtained by multiplying the wheel speed "v*l" of the left wheel by α. If the wheel speed "v*r" of the right wheel is higher than the value obtained by multiplying the wheel speed "v*l" of the left wheel by α (v*r>v*l×α; YES in step S500), the routine proceeds to step S1000. If the wheel speed "v*r" of the right wheel is equal to or lower than the value obtained by multiplying the wheel speed "v*l" of the left wheel by α (v*r≦v*l× α; NO in step S500), the routine proceeds to step S700.

In step S600, the ECU 300 determines whether the wheel speed "v*l" of the left wheel is higher than a value obtained by multiplying the wheel speed "v*r" of the right wheel by α. If the wheel speed "v*l" of the left wheel is higher than the value obtained by multiplying the wheel speed "v*r" of the right wheel by α (v*l>v*r×α; YES in step S600), the routine proceeds to step S1000. If the wheel speed "v*l" of the left wheel is equal to or lower than the value obtained by multiplying the wheel speed "v *r" of the right wheel by α (v*l≦v*r×α; NO in step S600), the routine proceeds to step S700.

Figure 3:
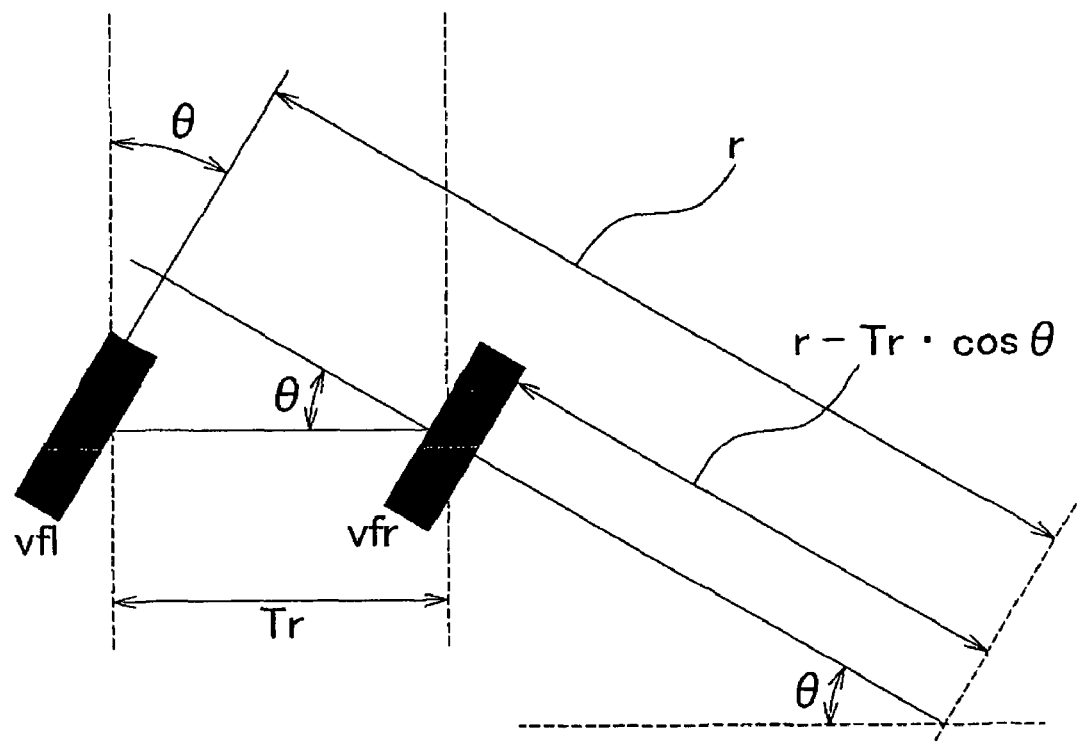
FIG. 3 is a diagram explaining a difference between wheel speeds of right and left wheels at the minimum turning radius.

Hereinafter, the value "α" will be described with reference to FIG. 3 showing the vehicle that is turning. In FIG. 3, the front wheels of the vehicle are turned at the maximum steering angle, and the vehicle is turning at the minimum turning radius.

When the vehicle is turning to the right, the wheel speed vfl of the front left wheel is higher than the wheel speed vfr of the front right wheel. The equation "vfl×r=vfr×(r−Tr×cos θ)" is satisfied. In this equation, "r" represents the minimum turning radius, "Tr" represents the tread of the vehicle, and "θ" represents the maximum turning angle of the wheel. By modifying the above-described equation, the equation "vfr=vfl×r/(r−Tr×cos θ)" is obtained. The above-described value "α" is equal to r/(r−Tr×cos θ). When the vehicle is the rear-wheel-drive vehicle, and the front wheels are not steering wheels, the value of θ is 0.

If an affirmative determination is made in step S500 or S600, the relation between the wheel speeds of the right and left wheels is geometrically abnormal, even if the vehicle is turning at the minimum turning radius. Therefore, in step S1000, an abnormality flag "xfrotat" is turned on.

In step S700, the ECU 300 determines whether the abnormality flag "xfrotat" is ON. If the abnormality flag "xfrotat" is ON (YES in step S700), the routine proceeds to step S800. If the abnormality flag "xfrotat" is OFF (NO in step S700), the routine proceeds to step S900.

In step S800, it is determined whether the equation "v*r≦v*l×α" or the equation "v*l≦v*r×α" is satisfied for at least a predetermined period. If the equation "v*r≦v*l×α" or the equation "v*l≦v*r ×α" is satisfied for at least the predetermined period (YES in step S800), the routine proceeds to step S1200. If the equation "v*r≦v*l×α" or the equation "v*l≦v*r×α" is satisfied for less than the predetermined period (NO in step S800), the routine proceeds to step S1000.

In step S900, it is determined whether a predetermined time has elapsed after a turning flag "xrotat" is turned on. If the predetermined time has not elapsed (NO in step S900), the routine proceeds to step S1100. If the predetermined time has elapsed (YES in step S900), the routine proceeds to step S1000.

In step S1000, the ECU 300 turns the abnormality flag "xfrotat" on to indicate that the determination as to whether the vehicle is turning (i.e., "turning determination") is abnormal.

In step S1100, the ECU 300 determines whether the absolute value Δspd of the difference between the wheel speeds of the right and left wheels is equal to or larger than a value that is obtained using a map in which the vehicle speed (vehicle body speed) "spdbdy" is used as a parameter (hereinafter, the value obtained using the map will be referred to as "map value"). If the equation "Δspd≧map value" is satisfied (YES in step S1100), the routine proceeds to step S1300. If the equation "Δspd≧map value" is not satisfied (NO in step S1100), the routine proceeds to step S1400. The map value is used to determine whether the vehicle is turning based on the absolute value Δspd of the difference between the wheel speeds of the right and left wheels. The map value varies depending on the vehicle speed (vehicle body speed).

In step S1200, the ECU 300 turns the abnormality flag "xfrotat" off to indicate that the turning determination is normal.

In step S1300, the ECU 300 turns the turning flag "xrotat" on to indicate that the vehicle is turning.

In step S1400, the ECU 300 turns the turning flag "xrotat" off to indicate that the vehicle is not turning.

The operation of the turning determination apparatus for a vehicle according to the embodiment based on the above-described structure and flowchart will be described. Hereinafter, the case where the front-engine rear-wheel-drive vehicle is turning to the left; the case where the vehicle is not turning; the case where the front right wheel 110 is slipping; and the case where the front right wheel 110, which has slipped, grips the road surface, will be described.

[Case where the Vehicle is Turning to the Left in the Normal State]

The vehicle speed (vehicle body speed) "spdbdy" is calculated (S100), and the absolute value Δspd of the difference between the wheel speeds of the front right wheel 110 and the front left wheel 120 is calculated using the equation |vfr−vfl| (S300). The wheel speed vfr of the front right wheel 110 is higher than the wheel speed vfl of the front left wheel 120 (vfr>vfl; YES in step S400). Because the wheels are not slipping, and the vehicle is moving (turning) in the normal state, the wheel speed vfr of the front right wheel 110 is equal to or lower than the value obtained by multiplying the wheel speed vfl of the front left wheel 120 by α (vtr≦vfl ×α; NO in step S500), and the abnormality flag "xfrotat" is OFF (NO in step S700).

Thus, when the predetermined time has not elapsed after the turning flag "xrotat" is turned on (NO in step S900), the vehicle is turning in the normal state (i.e., the wheels are not slipping). Therefore, the absolute value Δspd of the difference between the wheel speeds of the right and left wheels is equal to or larger than the map value (i.e., the value calculated using the map where the vehicle body speed "spdbdy" is used as the parameter) (YES in step S 1100). Thus, the turning flag "xrotat" is turned on, and it is determined that the vehicle is turning.

[Case where the Vehicle is Moving in the Normal State, and the Vehicle has Finished Turning, or the Vehicle is not Turning]

The vehicle speed (vehicle body speed) "spdbdy" is calculated (S100), and the absolute value Δspd of the difference between the wheel speeds of the front right wheel 110 and the front left wheel 120 is calculated using the equation | vfr−vfl | (S300). The wheel speed vfr of the front right wheel 110 is higher than the wheel speed vfl of the front left wheel 120 (vfr>vfl; YES in step S400). Because the wheels are not slipping, that is, the vehicle is moving in the normal state, and the vehicle has finished turning, or the vehicle is not turning, the wheel speed vfr of the front right wheel 110 is equal to or lower than the value obtained by multiplying the wheel speed vfl of the front left wheel 120 by α (vfr≦vfl ×α; NO in step S500), and the abnormality flag "xfrotat" is OFF (NO in step S700).

Thus, when the predetermined time has not elapsed after the turning flag "xrotat" is turned on (NO in step S900), the vehicle is not turning, and moving straight in the normal state (i.e., the wheels are not slipping). Therefore, the absolute value Δspd of the difference between the wheel speeds of the right and left wheels is smaller than the map value (i.e., the value calculated using the map where the vehicle body speed "spdbdy" is used as the parameter) (NO in step S100). Thus, the turning flag "xrotat" is turned off, and it is determined that the vehicle is not turning.

[Abnormal State: Case where the Front Right Wheel is Slipping]

The wheel speed vfr of the front right wheel 110 is higher than the wheel speed vfl of the front left wheel 120 (vfr>vfl; YES in step S400). Because the front right wheel 110 is slipping and the wheel speed of the front right wheel 110 is abnormally high, the wheel speed vfr of the front right wheel 110 is higher than the value obtained by multiplying the wheel speed vfl of the front left wheel 120 by α(vfr>vfl ×α; YES in step S500), and the abnormality flag "xfrotat" is turned on (S1000).

[Change from the Abnormal State to the Normal State: Case where the Front Right Wheel, which has Slipped, Grips the Road Surface]

If the front right wheel 110, which has slipped, grips the road surface (YES in step S400 and NO in step S500, or NO in step S400 and NO in step S600) after the abnormality flag "xfrotat" is turned on (S1000), the abnormality flag "xfrotat" remains ON (YES in step S700). Because the front right wheel 110, which has slipped, grips the road surface, the equation "the wheel speed vfr of the front right wheel 110≦the wheel speed vfl of the front left wheel 120×α" is satisfied for at least the predetermined period (YES in step S800). Therefore, the abnormality flag "xfrotat" is turned off (S1200).

Thus, the turning determination apparatus for a vehicle according to the embodiment can accurately determine whether the vehicle is turning, even when one of the right and left wheels is slipping.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A turning determination apparatus for a vehicle, comprising:
   a detection device that detects wheel speeds of right and left wheels of a vehicle;
   a calculation device that calculates a limit of a difference between the wheel speeds of the right and left wheels, based on a steering angle of the vehicle and a distance between the right and left wheels;
   an abnormality determination device that determines whether the difference between the wheel speeds of the right and left wheels is normal, based on the difference between the wheel speeds of the right and left wheels and the limit of the difference; and
   a turning determination device that determines whether the vehicle is turning based on the difference between the wheel speeds of the right and left wheels, when the difference between the wheel speeds of the right and left wheels is normal.

2. The turning determination apparatus according to claim 1, wherein:
   the vehicle includes right and left drive wheels that are connected to a driving power source, and right and left driven wheels that are not connected to the driving power source; and
   the detection device detects wheel speeds of the right and left driven wheels.

3. The turning determination apparatus according to claim 1, further comprising:
   a prohibition device that prohibits the turning determination device from determining whether the vehicle is turning, when the abnormality determination device determines that the difference between the wheel speeds of the right and left wheels is abnormal.

4. The turning determination apparatus according to claim 1, wherein the calculation device calculates the limit of the difference between the wheel speeds of the right and left wheels, based on a maximum steering angle and a minimum turning radius of the vehicle, and the distance between the right and left wheels.

5. The turning determination apparatus according to claim 1, wherein the abnormality determination device determines that the difference between the wheel speeds of the right and left wheels is abnormal when the difference between the wheel speeds of the right and left wheels is larger than the limit of the difference.

6. The turning determination apparatus according to claim 1, wherein the turning determination device determines that the vehicle is turning when the difference between the wheel speeds of the right and left wheels is larger than a predetermined threshold value.

7. A turning determination apparatus for a vehicle, comprising:
   detection means for detecting wheel speeds of right and left wheels of a vehicle;
   calculation means for calculating a limit of a difference between the wheel speeds of the right and left wheels, based on a steering angle of the vehicle and a distance between the right and left wheels;
   abnormality determination means for determining whether the difference between the wheel speeds of the right and left wheels is normal, based on the difference between the wheel speeds of the right and left wheels and the limit of the difference; and
   turning determination means for determining whether the vehicle is turning based on the difference between the wheel speeds of the right and left wheels, when the difference between the wheel speeds of the right and left wheels is normal.

8. A turning determination method comprising:
   detecting wheel speeds of right and left wheels of a vehicle;
   calculating a limit of a difference between the wheel speeds of the right and left wheels, based on a steering wheel of the vehicle and a distance between the right and left wheels;
   determining whether the difference between the wheel speeds of the right and left wheels is normal, based on the difference between the wheel speeds of the right and left wheels and the limit of the difference; and
   determining whether the vehicle is turning based on the difference between the wheel speeds of the right and left wheels, when the difference between the wheel speeds of the right and left wheels is normal.

9. The method according to claim 8, wherein the wheel speeds of the right and left wheels of the vehicle are wheel speeds of right and left driven wheels of the vehicle.

10. The method according to claim 8, further comprising:
    prohibiting determining whether the vehicle is turning based on the difference between the wheel speeds of the right and left wheels, when it is determined that the difference between the wheel speeds of the right and left wheels is abnormal.

11. The method according to claim 8, wherein the limit of the difference between the wheel speeds of the right and left wheels is calculated based on a maximum steering angle and a minimum turning radius of the vehicle, and the distance between the right and left wheels.

12. The method according to claim 8, wherein it is determined that the difference between the wheel speeds of the right and left wheels is abnormal when the difference of the wheel speeds of the right and left wheels is larger than the limit of the difference.

13. The method according to claim 8, wherein it is determined that the vehicle is turning when the difference between the wheel speeds of the right and left wheels is larger than a predetermined threshold value.

* * * * *